United States Patent [19]
Dyke

[11] 3,798,595
[45] Mar. 19, 1974

[54] BRAKE FLUID LEVEL MONITORING APPARATUS

[76] Inventor: Elbert S. Dyke, 24 Atlas Ave., San Jose, Calif. 95126

[22] Filed: Nov. 4, 1971

[21] Appl. No.: 195,685

[52] U.S. Cl. ............................. 340/59, 340/244 E
[51] Int. Cl. ........ G01f 23/12, B60q 5/00, B60c 5/32
[58] Field of Search ............ 340/244 E, 244 A, 59; 73/308, 311; 200/84 C, 61.2

[56] References Cited
UNITED STATES PATENTS

| | | | |
|---|---|---|---|
| 2,744,177 | 5/1956 | Barber | 340/59 |
| 3,611,285 | 10/1971 | Eggstein | 340/244 E |
| 3,051,805 | 8/1962 | Binford | 200/84 C |
| 3,389,603 | 6/1968 | Jacobs | 340/244 A |
| 2,330,845 | 10/1943 | Samiran | 73/311 |

Primary Examiner—Donald J. Yusko
Assistant Examiner—Glen R. Swann
Attorney, Agent, or Firm—Schatzel & Hamrick

[57] ABSTRACT

Apparatus for monitoring the level of fluid within a fluid reservoir, e. g. master cylinder reservoir, of a hydraulic brake system during bleeding operations. The apparatus comprises a housing having a fluid collection cavity, said cavity opening to the exterior and adapted to extend within the reservoir such that the fluid level within said cavity represents the fluid level within the reservoir. A sensor means senses the fluid level within the cavity and is adapted to control an indicating means in turn adapted to control an audible, visual or other recording device recording the condition of the indicator means.

3 Claims, 4 Drawing Figures

PATENTED MAR 19 1974 3,798,595
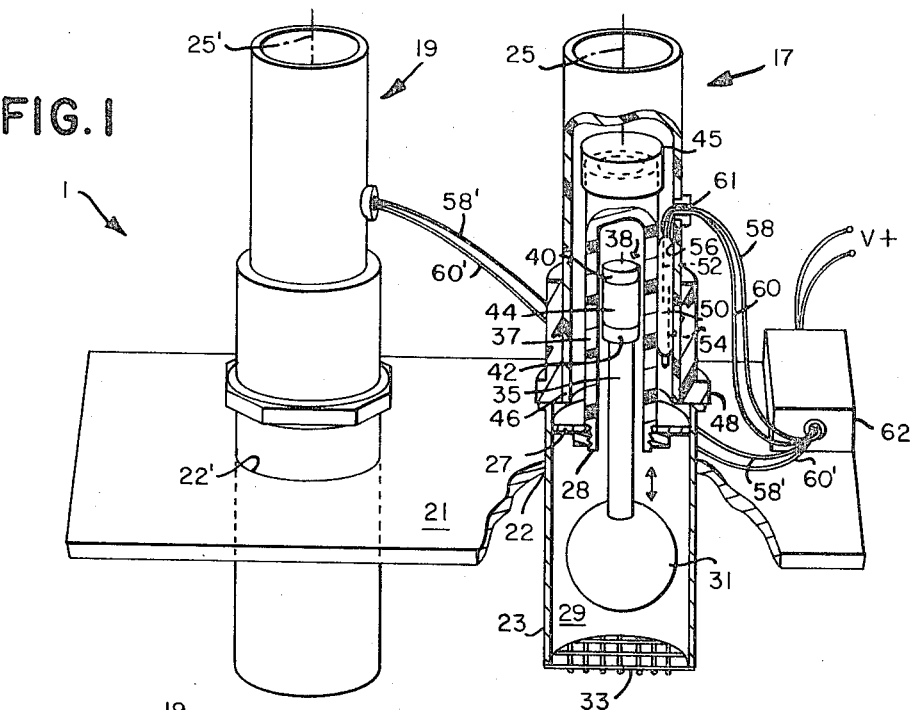
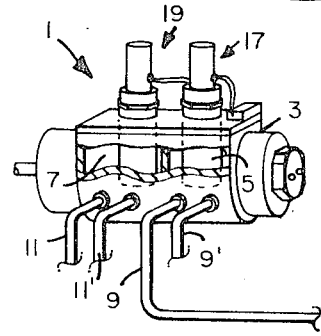
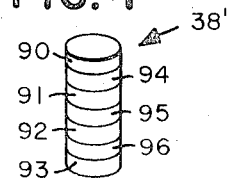
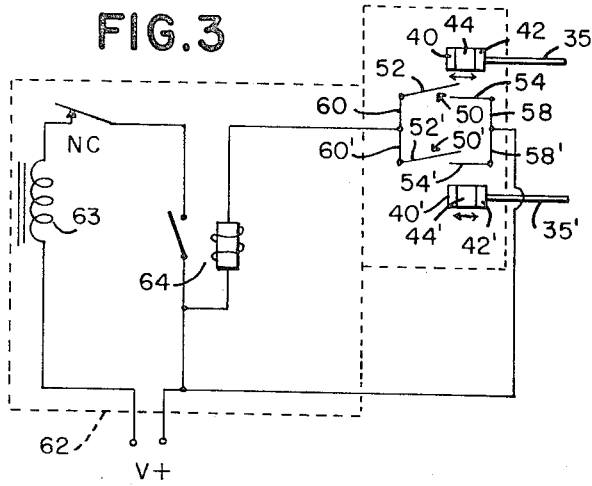
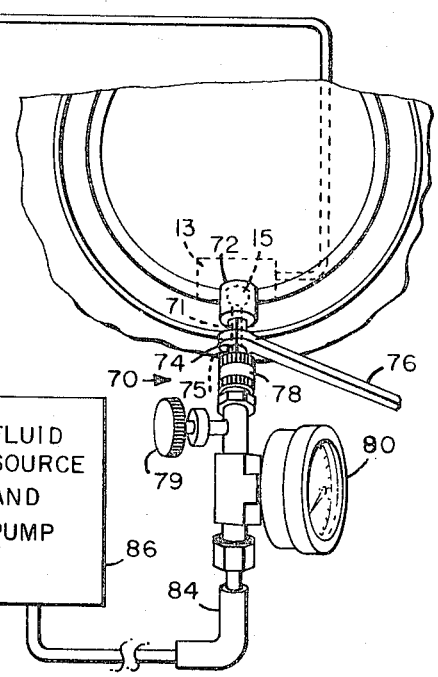

BRAKE FLUID LEVEL MONITORING APPARATUS

BACKGROUND OF THE INVENTION

The present invention relates to apparatus to facilitate the bleeding of trapped air from hydraulic brake systems of automotive vehicles.

As is well known, air bubbles frequently are trapped in the fluid lines and cylinders of a hydraulic brake system whenever the brake fluid is drained or replaced. Such trapped air must be removed to insure safe and effective braking operation.

Various approaches have been taken to facilitate the bleeding operation. For example, U.S. Pat. No. 3,548,978, by the present inventor, discloses and describes apparatus which permits a single operator to conduct the bleeding operation.

Heretofore it has been common practice to pump brake fluid from the master cylinder to the wheel cylinders and bleed the fluid through the wheel cylinder bleeder valve to exit entrapped air. With various brake systems, e.g. disc brake systems, it is desirable to enter brake fluid at the wheel cylinder, or brake calipers, and pump the fluid to the master cylinder reservoir. With such operations, it is necessary to monitor the level of the brake fluid within the master cylinder reservoir as the bleeding operation is conducted at each wheel to determine the fluid level within the reservoir and to determine if the fluid lines extending from the master cylinder to the wheel cylinders or brake calipers are filled with fluid. Monitoring the fluid level within the master cylinder reservoir by a single operator frequently is awkward and cumbersome since it is remotely located relative to the wheel cylinders and brake calipers.

SUMMARY OF THE PRESENT INVENTION

The present invention teaches monitoring apparatus to facilitate sensing and indicating the level of fluid within a master cylinder reservoir during bleeding operations. The apparatus is adapted to sense the fluid level and to generate indications, e.g. warning signals, as the fluid level assumes designated levels. Such indications may serve as warnings to the operator that the fluid within the reservoir has reached a predesignated level. The predesignated levels serve as indications that the brake fluid tubes extending between the master cylinder and the wheel cylinder or brake caliper at which fluid is being entered are filled with fluid.

An exemplary embodiment of the monitoring apparatus of the present invention includes a hollow, open-ended housing adapted to fit within the master cylinder reservoir. The housing forms a cavity and is adapted to permit the fluid within the reservoir to enter within said cavity such that the fluid level within the housing coincides with the level within the reservoir. A float member is positioned within the housing cavity to sense the fluid level and to control an electronic switch means responsive to the actual fluid level. The switch means in turn controls an alarm system to indicate to the operator the level of the fluid within the master cylinder reservoir. Upon receiving the warning alarm, the operator may regulate the brake fluid entering the wheel cylinder or brake caliper.

BRIEF DESCRIPTION OF THE DRAWINGS

FIG. 1 is a partially sectioned perspective view of a monitor apparatus incorporating the teachings of the present invention as adapted for incorporation with a master cylinder having two reservoirs;

FIG. 2 is a view in perspective of the monitor apparatus of FIG. 1 in position in conjunction with a master cylinder and wheel cylinder of an automobile, during bleeding operations;

FIG. 3 is an electrical schematic diagram of the apparatus of FIG. 1; and

FIG. 4 is an alternative embodiment of a magnet member for incorporation with a sensor-indicator apparatus adapted for incorporation within a master cylinder having a single reservoir.

DESCRIPTION OF PREFERRED EMBODIMENT

The drawings depict a monitor apparatus, referred to by the general reference character 1 and incorporating the teachings of the present invention. As illustrated the monitor apparatus 1 is adapted to be incorporated with a double-reservoir master cylinder 3 having a first reservoir 5 and a second reservoir 7. Each of the reservoirs 5 and 7 are joined to a pair of fluid lines 9, 9' and 11, 11', respectively. The fluid line 9 extends to a wheel cylinder 13, e.g. the right wheel cylinder of an automobile, such that hydraulic fluid may be entered through a bleeder valve 15 and forced to the master cylinder 3 as hereinafter described. It is to be understood that brake calipers utilizing hydraulic pistons are commonly used on disc brake systems in place of wheel cylinders. For purposes of this application the term wheel cylinder is used to mean either a wheel cylinder or brake caliper.

The monitor apparatus 1 includes a pair of sensor-indicators 17 and 19 of identical structure supported by a base support 21. For purposes of clarity the elements of the sensor-indicator 17 will be described and similar elements of the sensor-indicator 19 will carry the same reference numeral distinguished by a prime designation. The base support 21 carries a pair of apertures 22 and 22' and is adapted to support the sensor-indicators 17 and 19 in a vertical position relative to the fluid surface within the reservoir. The support 21 covers the opening of the master cylinder 3 during the bleeding operations. The sensor-indicator 17 includes a cylindrical, hollow housing 23 coaxial about an axis 25 and protruding through the aperture 22 of the base support 21 such that it becomes at least partially submerged as the reservoir is filled with fluid. The desired degree of protrusion of the housing 23 within the reservoir is dependent upon the depth of the master cylinder reservoir. The degree of protrusion may be controlled by sliding the base 21 vertically relative to the housing 23. An O-ring 27, with a central aperture 28, is positioned within the interior of the housing 23 at a position from the lower terminal end to establish a fluid collection cavity 29 within the housing 23. A float 31 is positioned within the cavity 29 and a screen 33 is positioned over the terminal end of the cylinder 23 to retain the float 31 within the cavity 29 while permitting fluid to enter and exit said cavity 29. The fluid level within the cavity 29 coincides with the level within the reservoir 5. The float 31 is adapted to float over the top surface of the fluid within the cavity 29. The float 31 carries a stem 35 protruding through the aperture 28 of the O-ring 27.

The stem 35, as hereinafter described serves as an actuator control to control an electrical control station responsive to the fluid level within the cavity 29. About the top surface of the O-ring 27 is supported a cylindrical guide member 37 of non-magnetic material and forming a chamber coaxial with the axis 25. A cylindrical permanent magnet member 38 is positioned within the interior of the guide member 37. The magnet member 38 is adapted to engage the terminal end of the stem 35 and to float within the chamber formed by the guide member 37 responsive to the vertical position of the stem 35 such that the lateral position of the magnet member 38 is controlled by the interior walls of the guide member 37 and the vertical position of the magnet member 38 is controlled by the stem 35. The magnet member 38 comprises a pair of permanent magnet discs 40 and 42 integral with a non-magnetic cylindrical spacer 44. A removable cap 45 is secured about the top opening of the member 37 so as to preclude foreign particles from entering the interior of the member 37 and cavity 29.

The cylinder 23 is engaged about its top terminal end to a nonmagnetic hollow cylinder 46 by means of a coupler 48, coaxial with the axis 25. Intermediate the interior wall of the cylinder 46 and the exterior wall of the cylinder 37 is a magnetically operable switch in the form of a glass-enclosed hermetically sealed dry reed switch 50 having a pair of normally open reeds 52 and 54 enclosed within a glass enclosure 56. The reeds 52 and 54 have overlapped contacts adapted to make or break electrical contact relative to one another responsive to the strength of a magnetic field between the contacts. The switch 50 is positioned such that the position of the overlapped contacts of the reeds 52 and 54 respond to the magnetic field of the magnets 40 and 42. The effect of the magnetic field of the magnets 40 and 42 is dependent on the proximity of either of the magnets 40 or 42 to the contacts of the reeds 52 and 54. Accordingly, with either the magnet 40 or 42 adjacent the contact ends of the reeds 52 and 54, the contacts close and as the magnets are moved away the contacts assume their normally open relationship. With the spacer 44 adjacent the contacts, as shown, they assume the normally open relationship. The reeds 52 and 54 are respectively engaged to a lead wire 58 and 60 extending through an aperture 61 in the side wall of the cylinder 46 to the exterior. The magnet member 38 and the switch 50 in combination form an electrical control station to control electrical apparatus engaged to the leads 58 and 60 as illustrated by the broken line block 62 of the circuit diagram of FIG. 3. The leads 58 and 60 extend to a recording device adapted to generate recordations of the condition of the switch 50 of the control station. In the illustrated embodiment, the recording device is in the form of a buzzer assembly 63 controlled by an electromagnetic relay 64, adapted to respond to the contact relationship of the switch 50. The buzzer assembly 63 extends to a direct current potential source V+, e.g. battery of the automobile. The switches 50 and 50' are electrically joined in parallel such that either switch may control the buzzer assembly 63 through the electromagnetic relay 64, independent of the other switch. It may be noted that with the magnet 40 adjacent to normally open contacts of the switch 50, the contacts close thereby actuating the relay 64 and the buzzer 63. The position of the housing 23 may have been selected relative to the base member 21 such that the fluid level within the cavity 29 and reservoir 5 need assume a pre-selected height to raise the magnet 40 adjacent to the contacts of the switch 50 to actuate the buzzer 63. As the fluid level within the master cylinder reservoir 5 and cavity 29 rise, the magnet 40 rises and the spacer 44 is positioned adjacent the contacts such that the contacts 52 and 54 of the switch 50 reassume their normally open relationship, the relay 64 opens and the buzzer 63 is deactivated. A further increase of the fluid level causes a further rise of the magnet 42. As the magnet 42 comes adjacent to the contacts 52 and 54, the contacts again close thereby actuating the relay 64 and the buzzer 63. As the magnet member 38 is raised or lowered the buzzer 63 is deactivated.

Accordingly, in operation, for filling the brake lines and master cylinder of an automobile, the brake line 9 may be assumed to extend to the right rear wheel of the automobile, the line 9' to the left rear wheel, the line 11 to the right front wheel and the line 11' to the left front wheel. The operator will first drain all fluid from the master cylinder reservoirs 5 and 7. Then starting at the right rear wheel, as indicated in FIG. 2, hydraulic fluid is pumped into the wheel cylinder 13 through the bleeder valve 15 forcing the fluid through the line 9 to the reservoir 5 of the master cylinder 3. The sensor-indicator 17 responds to the fluid level within the reservoir 5. As the fluid level raises, it raises the float 31 and the magnet member 38. When the level is sufficient to position the magnet 40 adjacent the contacts of the switch 50, the indication is recorded by the alarm sound of the buzzer 63. The buzzer thus informs the operator that the line 9 is full of fluid and the air removed. The operator may permit an additional amount of fluid to be entered to raise the member 38 such that the spacer 44 is adjacent the switch contacts thereby deactivating the buzzer 63. The operator then discontinues pumping fluid and closes the bleeder valve 15 on the wheel cylinder. The operator may then move to the left rear wheel where the procedure is repeated. As fluid is pumped into the bleeder valve and wheel cylinder of the left rear wheel, the fluid level within the reservoir 5 continues to rise. The spacer 44 moves past the contacts and the magnet 42 is urged adjacent to the switch contacts. With the magnet 42 adjacent the contacts, the contacts close and again activate the buzzer 63, thus informing the operator that the line 9' is full of fluid and the air removed. The operator may then permit an additional amount of fluid to be entered to further raise the member 38 such that the contacts open thereby deactivating the buzzer. The operator may then close the bleeder valve on the left rear wheel cylinder. The operator then successively repeats the procedure for the right front and left front wheels in which case the sensor-indicator 19 controls the buzzer 63.

FIG. 2 further illustrates a tool-gauge assembly 70 for controlling the bleeder valves and fluid pressure during the operation. The assembly 70 includes a socket 72 for engaging the bleeder valve. The socket 72 has a central portal 71 to permit the passage of fluid. The socket 72 is joined to a body 74 engaged to a lateral arm 76. The body 74 has a central portal 75 extending to the portal 71 to permit passage of fluid. The body 74 is coupled through a coupler 78 and a valve 79 to a pressure gauge 80. The gauge 80 is, in turn, joined to a tubing 84 extending to a hydraulic fluid source and pump 86. For example, the fluid source and pump 86 may be in the form of a drum of brake fluid mounted on a cart with a pump as depicted and described in U.S. Pat. No. 3,548,978. During operations the fluid source and pump 86 pumps fluid which may be entered to the wheel cylinder 13 by controlling the bleeder valve 15 and valve 79. The bleeder valve 15 may be controlled by control of the lateral arm 76. During the bleeding operations, the socket 72 is first engaged to the bleeder valve 15 with the valve 79 closed. The bleeder valve is opened and then the valve 79 is opened to permit fluid to be entered. The fluid pressure is recorded by the meter 80. Fluid is pumped until the buzzer alarm 63 is activated and then deactivated at which time the valve 79 is closed. Then the bleeder valve 15 is closed. The operator may then disconnect the tool-gauge assembly 70 from the bleeder valve 15 and then reconnect the tool-gauge 70 to another bleeder valve of another wheel cylinder and repeat the procedure.

Though the illustrated embodiment of the apparatus illustrates a pair of sensor-indicators 17 and 19 for master cylinders having a pair of reservoirs, the apparatus may be modified for master cylinders having a single reservoir. For single reservoir master cylinders, only a single sensor-indicator is needed with the sensor-indicator adapted to respond to more than two positions. Such adaptions include a magnet member 38' as illustrated in FIG. 4. The magnet member 38' includes four disc magnets, 90, 91, 92 and 93 separated from one another by non-magnetic spacers 94, 95 and 96. During operations, the magnet member 38 of the sensor-indicator 17 may be removed and replaced by the magnet member 38'. Accordingly, the buzzer 63 is activated at each of four distinct feed levels within the master cylinder reservoir.

I claim:

1. Apparatus for monitoring the increasing level of fluid within a master cylinder reservoir of a hydraulic brake system of an automobile during air bleeding operations while fluid is pumped into the reservoir from brake fluid lines, the apparatus comprising:
 a base support member for engaging a master cylinder about an opening to the fluid reservoir of the master cylinder during air bleeding operations while fluid is pumped into the reservoir from brake fluid lines;
 a housing forming an internal fluid collection cavity, the housing being supported by the base support member to position said cavity at least partially within the interior of said fluid reservoir, said cavity opening to the interior of the reservoir to permit fluid pumped into the reservoir from brake fluid lines to flow within said cavity during said air bleeding operations such that the increasing level of fluid within said cavity corresponds with the increasing level of fluid within said reservoir;
 an electrically non-conductive float positioned with said fluid collection cavity for sensing the fluid level within said fluid collection cavity with the elevation of the float within said cavity increasing simultaneously as the fluid level increases;
 a permeable member positioned over said cavity opening to entrap said float within said cavity and to permit fluid to enter within said cavity;
 an actuator control arm engaged to and projecting axially from said float, the arm extending to the exterior of said fluid collection cavity housing to within an internal guide chamber of an elongated guide member projecting above said base support member, said guide chamber being in coaxial alignment with said cavity and laterally guiding said control arm permitting said arm to travel longitudinally within said guide chamber responsive to the elevation level of the float within said collection cavity;
 an electrical control station responsive to the actuator control arm for indicating the elevated position of the control arm within said elongated guide chamber, the control station including a magnet member engaged about one terminal end of said control arm and within said elongated guide chamber, a magnetically operable switch means positioned laterally adjacent to said guide member about the exterior of said guide member and elevated relative to said collection cavity, said switch means including overlapping contacts for electrically making and breaking an electrical circuit responsive to the elevated position of said magnetic member within said chamber relative to the elevation of said overlapping contacts, said magnet member having a magnetic field strength sufficient to actuate said contacts when said magnet is elevated to a position within said guide chamber laterally adjacent to said contacts; and
 an indicating device electrically coupled to said switch means and adapted to indicate the making and breaking of said electrical circuit.

2. The apparatus of claim 1 wherein
said magnet member includes a non-magnetic spacer having a longitudinal axis parallel to the axis of said guide member, a first magnet engaged about one end of said spacer and a second magnet engaged about the other end of said spacer, said spacer being of sufficient length to permit said magnets to be positioned on opposite sides of said overlapping contacts without either of said magnets actuating said contacts.

3. The apparatus of claim 2 wherein
said switch means and overlapping contacts includes a reed switch having a pair of normally open overlapping contacts sealed within an enclosure, said enclosure being positioned in abutment with the exterior of said elongated guide member adjacent to the travel path of said magnet member within said internal guide chamber.

* * * * *